United States Patent
Okada et al.

(10) Patent No.: US 8,388,749 B2
(45) Date of Patent: Mar. 5, 2013

(54) STRONTIUM CARBONATE MICROPOWDER AND PROCESS FOR PRODUCTION

(75) Inventors: Fumio Okada, Ube (JP); Takeshi Himoto, Ube (JP)

(73) Assignee: Ube Material Industries, Ltd., Ube-shi, Yamaguchi (JP)

( * ) Notice: Subject to any disclaimer, the term of this patent is extended or adjusted under 35 U.S.C. 154(b) by 0 days.

(21) Appl. No.: 13/504,723

(22) PCT Filed: Oct. 28, 2010

(86) PCT No.: PCT/JP2010/069167
§ 371 (c)(1),
(2), (4) Date: Apr. 27, 2012

(87) PCT Pub. No.: WO2011/052680
PCT Pub. Date: May 5, 2011

(65) Prior Publication Data
US 2012/0214927 A1    Aug. 23, 2012

(30) Foreign Application Priority Data

Oct. 28, 2009 (JP) .................................. 2009-247877

(51) Int. Cl.
*C01F 11/18* (2006.01)
(52) U.S. Cl. ......... 106/463; 427/220; 427/221; 428/407
(58) Field of Classification Search .................. 106/463; 423/430, 432; 427/220, 221; 428/407
See application file for complete search history.

(56) References Cited

U.S. PATENT DOCUMENTS

2010/0040885 A1 * 2/2010 Ichimura et al. .............. 428/407

FOREIGN PATENT DOCUMENTS

JP          2007-99614 A   *   4/2007
WO    WO2008/111612 A1   *   9/2008

* cited by examiner

*Primary Examiner* — Anthony J Green
(74) *Attorney, Agent, or Firm* — Nixon Peabody LLP; Jeffrey L. Costellia

(57) ABSTRACT

A fine strontium carbonate powder having a BET specific surface area of 20 to 150 $m^2/g$, which comprises spherical particles having a mean aspect ratio of 2.0 or less shows high dispersibility in liquid media and is of value for producing dielectric ceramic materials such as strontium titanate.

5 Claims, 2 Drawing Sheets

STRONTIUM CARBONATE MICROPOWDER AND PROCESS FOR PRODUCTION

FIELD OF THE INVENTION

The present invention relates to a fine strontium carbonate powder and a process for producing the same.

BACKGROUND OF THE INVENTION

A strontium carbonate powder is of value as a material for producing dielectric material powders such as strontium titanate powder. For instance, the strontium titanate powder can be produced by mixing strontium carbonate powder and titanium dioxide powder to give a mixture thereof and calcinating the mixture. The dielectric material powders can be utilized for producing dielectric ceramic layers of multilayer ceramic capacitors.

Since electronic devices are recently requested to have a smaller size, the multilayer ceramic capacitors are also requested to have a smaller size. In order to manufacture multilayer ceramic capacitors, it is required that the dielectric ceramic layers of multilayer ceramic capacitors have a decreased thickness. In order to produce dielectric ceramic layers having a decreased thickness, it is necessary to employ fine dielectric ceramic powders having a uniform composition.

The fine and uniform dielectric ceramic powders can be produced from a uniform powdery mixture comprising fine ceramic components. The uniform powdery mixture is generally produced by a wet-mixing procedure. Therefore, it is desirous that the strontium carbonate powder for the production of a dielectric ceramic powder is fine and shows high dispersiblity in liquid media.

JP 2007-76934 A discloses a process for preparing a fine strontium carbonate powder, which comprises the steps of supplying gaseous carbonate dioxide into an aqueous solution or dispersion containing strontium hydroxide in an amount of 1 to 20 wt. % under stirring at a flow rate of 0.5 to 200 mL/min., per one gram of the strontium hydroxide, in the presence of an organic acid having 3 to 12 carbon atoms and at least two carboxyl groups or hydroxyl groups or carboxyl group in one molecule, thereby carbonating the strontium hydroxide to give an aqueous dispersion containing strontium carbonate particles; and drying the dispersion. Examples of the organic acid include citric acid, malic acid, adipic acid, gluconic acid, glucaric acid, tartaric acid, maleic acid, and ascorbic acid. Preferred are citric acid and ascorbic acid. JP 2007-76934 further describes that the disclosed process gives a fine strontium carbonate powder having a specific surface of 52 to 300 $m^2/g$ and that the fine strontium carbonate powder can be pulverized by means of ceramic beads to give strontium carbonate particles comprising primary particles having a size of 5 to 50 nm (size calculated from projected area thereof) and an aspect ratio of 2 or less.

JP 2008-222496 A discloses that a fine strontium carbonate powder showing increased dispersibility in liquid media can be prepared by treating a strontium carbonate powder with a polymer comprising a polycarboxylic acid or anhydride thereof which has a side chain of polyoxyalkylene group. JP 2008-222496 A further discloses that the treatment of a strontium carbonate powder with a polymer comprising a polycarboxylic acid or anhydride thereof which has a side chain of polyoxyalkylene group can be performed by pulverizing strontium carbonate particles in an aqueous medium containing the polymer by the use of ceramic beads.

SUMMARY OF THE INVENTION

The pulverization utilizing ceramic beads which are disclosed in the above-mentioned two JP publications is effective to prepare a fine strontium carbonate powder. However, there are problems in that the pulverized strontium carbonate particles likely are in the form of irregular polyhedral particles having sharp edges. A strontium carbonate powder containing a large amount of the irregular polyhedral particles with sharp edges show poor dispersiblity in liquid media and therefore it is difficult to prepare a powdery mixture having uniform composition. In addition, a finally produced fine strontium carbonate powder is sometimes contaminated with ceramic material produced by abrasion of the ceramic beads.

Accordingly, it is an object of the present invention is to provide a fine strontium carbonate powder showing good dispersibility in liquid media.

It is another object of the invention to provide a process for preparing the fine strontium carbonate powder showing good dispersibility in liquid media without performing pulverization with ceramic beads.

The present inventors have discovered that a small sized strontium carbonate powder having a BET specific surface area of 20 to 150 $m^2/g$, which comprises spherical particles having a small mean aspect ratio of 2.0 or less can be prepared by a process which comprises the steps of: supplying gaseous carbonate dioxide into an aqueous solution or dispersion containing strontium hydroxide in the presence of an organic acid having at least one hydroxyl group and at least one carboxyl group under the condition that a total of the hydroxyl group and carboxyl group is at least three (for example, tartaric acid, malic acid, and gluconic acid) under the specific conditions, thereby carbonating the strontium hydroxide to give an aqueous dispersion containing strontium carbonate particles; stirring for mixing the aqueous dispersion containing strontium carbonate particles by means of paddles rotating at such a high peripheral rate as 5 to 32 m/sec., in the presence of a polymer comprising a polycarboxylic acid or anhydride thereof having a side chain of a polyoxyalkylene group; and drying the stirred aqueous dispersion. Thus, there is no need of performing pulverization using ceramic beads in this process.

The inventors have then confirmed that the thus prepared fine strontium carbonate powder can be relatively easily dispersed in liquid media in the form of well dispersed fine particles.

Accordingly, the present invention resides in a fine strontium carbonate powder having a BET specific surface area of 20 to 150 $m^2/g$, which comprises spherical particles having a mean aspect ratio of 2.0 or less.

Preferred embodiments of the fine strontium carbonate powder of the invention are described below.

(1) The mean aspect ratio is in the range of 1.2 to 2.0.

(2) The spherical particles have a polymer comprising a polycarboxylic acid or anhydride thereof having a side chain of a polyoxyalkylene group attached to surfaces thereof.

The invention further resides in a process for preparing the fine strontium carbonate powder of the present invention, which comprises the steps of:

supplying gaseous carbonate dioxide into an aqueous solution or dispersion containing strontium hydroxide in an amount of 1 to 20 wt. % under stirring at a flow rate of 0.5 to 200 mL/min., per one gram of the strontium hydroxide, in the presence of an organic acid having at least one hydroxyl group and at least one carboxyl group under the condition that a total of the hydroxyl group and carboxyl group is at least three, thereby carbonating the strontium hydroxide to give an aqueous dispersion containing strontium carbonate particles;

stirring for mixing the aqueous dispersion containing strontium carbonate particles by means of paddles rotating at a peripheral rate of 5 to 32 m/sec., in the presence of a polymer comprising a polycarboxylic acid or anhydride thereof having a side chain of a polyoxyalkylene group; and drying the stirred aqueous dispersion containing strontium carbonate particles.

Preferred embodiments of the process for preparing the fine strontium carbonate powder are described below.

(1) The organic acid is selected from the group consisting of tartaric acid, malic acid and gluconic acid.

(2) The polymer comprising a polycarboxylic acid or anhydride thereof having a side chain of a polyoxyalkylene group is added to the aqueous dispersion containing strontium carbonate particles in the step of the stirring step.

EFFECTS OF THE INVENTION

The fine strontium carbonate powder of the invention comprises fine spherical particles and hence shows good dispersibility in liquid media. Therefore, a fine and uniform powdery mixture of the strontium carbonate powder with other powdery material such as titanium dioxide powder can be obtained by mixing these powders under wet conditions. The resulting mixture can be employed to produce a fine and uniform strontium titanate which can be utilized as a dielectric ceramic powder.

The process of the invention can be favorably employed for the preparation of the fine strontium carbonate of the invention without pulverization using ceramic beads.

PREFERRED EMBODIMENTS OF THE INVENTION

Figure 1:
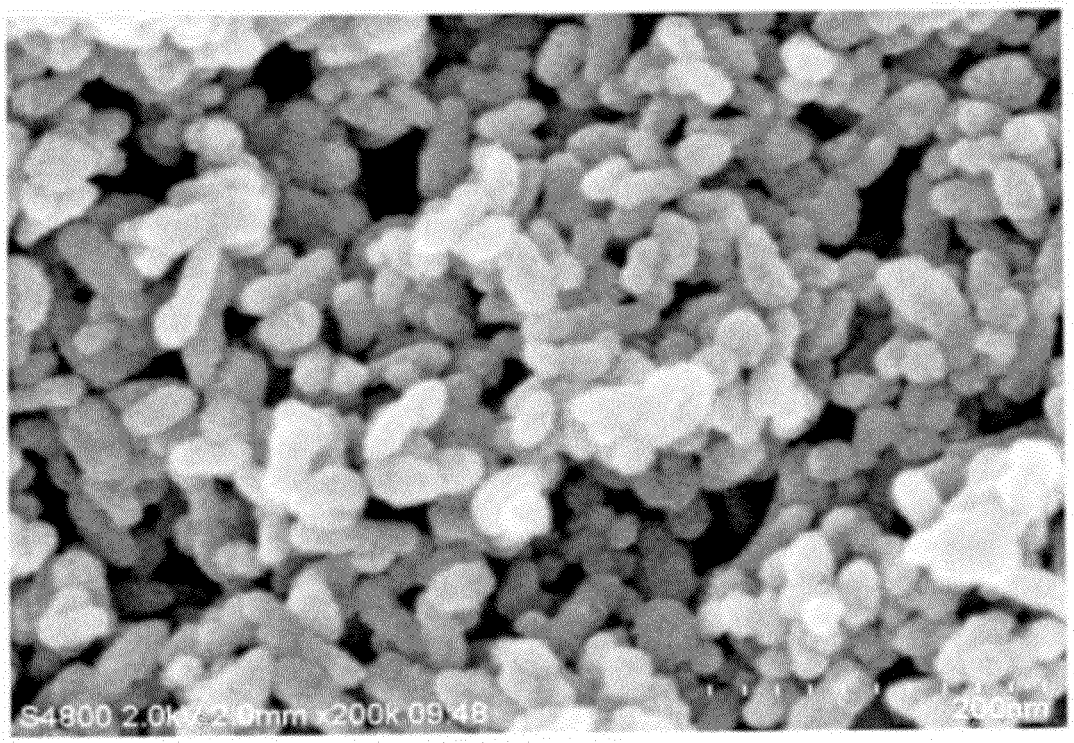
FIG. 1 is an electron microscopic image of the strontium carbonate powder produced in Example 1.

The fine strontium carbonate powder of the invention comprises aggregated spherical particles having a mean aspect ratio (long diameter/short diameter) of 2.0 or less. The mean aspect ratio preferably is in the range of 1.2 to 2.0, and more preferably in the range of 1.2 to 1.9. The spherical particles are not necessary in the form of precisely spherical particles (i.e., particles of true sphere) and can be in the form of prolonged sphere or true or prolonged cube whose edges are rounded.

Further, it is not necessary that all of the strontium carbonate particles comprised in the fine strontium carbonate powder are spherical. However, it is preferred that at least 60% or more (in terms of number of particles), specifically 80% or more, of the particles are spherical particles. The spherical particles generally are primary particles.

The fine strontium carbonate powder of the invention has a BET specific surface area in the range of 20 to 150 $m^2/g$, preferably in the range of 40 to 150 $m^2/g$, more preferably in the range of 60 to 150 $m^2/g$. In other words, the fine strontium carbonate powder of the invention comprises very fine strontium carbonate particles having a particle size (derived from BET specific surface area) in the range of 11 to 81 nm, preferably 11 to 41 nm, more preferably 11 to 27 nm.

The particle size derived from BET specific surface area can be obtained by the following calculation:

Particle size (from BET specific surface area)=1,000×
6/[BET specific surface area ($m^2/g$)×true density
of strontium carbonate (3.70 $g/cm^3$)]

The fine strontium carbonate powder of the invention can be prepared by a process comprising the following steps:

Step for preparing an aqueous dispersion of strontium carbonate particles, which is performed by supplying gaseous carbonate dioxide into an aqueous solution or dispersion containing strontium hydroxide in the presence of a specific organic acid, for carbonating the strontium hydroxide to give an aqueous dispersion containing strontium carbonate particles;

Step for stirring & mixing, which is performed by stirring for mixing the aqueous dispersion containing strontium carbonate particles by means of paddles rotating in the presence of a polymer comprising a polycarboxylic acid or anhydride thereof having a side chain of a polyoxyalkylene group; and Step for drying, which comprises drying the stirred aqueous dispersion containing strontium carbonate particles.

The aqueous solution or dispersion of strontium hydroxide employed in the step for preparing an aqueous dispersion of strontium carbonate particles generally contains strontium hydroxide in an amount of 1 to 20 wt. %, preferably 2 to 15 wt. %, more preferably 3 to 8 wt. %.

The organic acid employed in the step for preparing an aqueous dispersion of strontium carbonate particles has at least one hydroxyl group and at least one carboxyl group under the condition that a total of the hydroxyl group and carboxyl group is at least three. The organic acid preferably has one or two carboxyl groups and the total preferably is 3 to 6. Examples of the organic acid include tartaric acid, malic acid and gluconic acid. The organic acid can be employed in combination. Tartaric acid preferably is DL-tartaric acid. Malic acid preferably is DL-malic acid. Gluconic acid preferably is Dgluconic acid. The organic acid is employed generally in an amount of 0.1 to 20 weight parts, preferably 1 to 10 weight parts, per 100 weight parts of strontium hydroxide. The organic acid can serve as a crystal growth-suppressing agent for suppressing growth of strontium carbonate crystals produced by the carbonation of strontium hydroxide and as an aggregation-suppressing agent for suppressing aggregation of strontium carbonate particles produced by the carbonation of strontium hydroxide.

Carbon dioxide is supplied into an aqueous strontium hydroxide solution or dispersion in a flow rate of generally 0.5 to 200 mL/min., preferably 0.5 to 100 mL/min., per one gram of the strontium hydroxide. The carbonation of strontium hydroxide is generally finished when the aqueous solution or dispersion becomes to show pH 7 or less.

The carbonation of strontium hydroxide is preferably carried out in an aqueous strontium hydroxide solution or dispersion at a temperature of 0 to 40° C., preferably 0 to 30° C., more preferably 5 to 15° C.

The polymer comprising a polycarboxylic acid or anhydride thereof having a side chain of a polyoxyalkylene group which is used in the step for stirring & mixing preferably is a polycarboxylic acid anhydride having a side chain of a polyoxyalkylene group. The polycarboxylic acid anhydride preferably is a maleic anhydride polymer. Examples of the polycarboxylic acid anhydride having a side chain of a polyoxyalkylene group are available from Nihon Oil & Fat Co., Ltd., under tradenames of Mariarim KM-0521, Mariarim AKM-0531, Mariarim AKM-151160, Mariarim HKM-50A, and Mariarim AKM-150A.

The above-mentioned polymer can be employed in an amount of generally 0.5 to 20 weight parts, preferably 1 to 10 weight parts, per 100 weight parts of strontium carbonate contained in the aqueous dispersion.

The polymer can be incorporated an aqueous strontium hydroxide solution or dispersion in advance of carbonation. However, it is preferred that the polymer is added to the aqueous dispersion of strontium carbonate particles.

The paddles employed for stirring & mixing the aqueous dispersion of strontium carbonate particles generally rotate at a peripheral rate of 5 to 32 m/sec., preferably 5 to 16 m/sec. The stirring & mixing can be carried out by means of a homo-mixer. The stirring & mixing can be carried out generally for 1 to 200 min., preferably 10 to 100 min.

In the drying step performed after the step for stirring & mixing, the aqueous dispersion of strontium carbonate particles can be dried by means of a dryer such as a spray dryer or a drum dryer.

EXAMPLES

Example 1

In 3 L of pure water kept at 10° C. was placed and mixed 366 g of strontium hydroxide 8 hydrates to prepare an aqueous strontium hydroxide dispersion (concentration: 5.6 wt. %). To the aqueous strontium hydroxide dispersion was added 7.1 g (4.3 weight parts per 100 weight parts of strontium hydroxide) of tartaric acid (DL-tartaric acid, special class, available from Wako Junyaku Co., Ltd.). The resulting mixture was stirred to have tartaric acid solved. The aqueous strontium hydroxide dispersion was kept at 10° C. and gaseous carbon dioxide was introduced into the aqueous dispersion under stirring at a flow rate of 3.75 L/min. (i.e., 22 mL/min., per one gram of strontium hydroxide) until the aqueous dispersion showed pH 7, so as to produce strontium carbonate particles. The aqueous dispersion of strontium carbonate particles were further stirred for 30 minutes.

To thus produced aqueous dispersion of strontium carbonate particles was added 15 g (9.6 weight parts per 100 weight parts of strontium carbonate) of Mariarim KM-0521 (available from Nihon Fat & Oil Co., Ltd.). The resulting mixture was stirred for mixing in a homo-mixer (T.K. Homomixer Mark II, available from Primix Co., Ltd.) under the condition that the puddles were rotated at a rate of 7.85 m/sec., for one hour. After the stirring was complete, the aqueous dispersion of strontium carbonate particles was dried to give a strontium carbonate powder.

The electron microscopic image of the resulting strontium carbonate powder is shown in FIG. 1. From the image of FIG. 1, it was confirmed that the resulting strontium carbonate powder was in the form of aggregated mass of spherical particles. The strontium carbonate powder was a fine powder showing a BET specific surface area of 107.2 $m^2/g$ and a particle diameter (calculated from BET specific surface area) of 15.1 nm. A mean aspect ratio calculated from 300 strontium carbonate particles seen in the electron micrographic image was 1.6.

Subsequently, 0.2 g of the resulting strontium carbonate powder was taken and placed in 20 mL of an aqueous hexametaphosphoric acid solution (concentration: 0.2 wt. %). The aqueous mixture was then subjected to a dispersing procedure for 5 minutes by means of a ultrasonic homogenizer (SONIFIER 150, available from BRAMSON Corp.), to give a dispersion of strontium carbonate particles.

The average particle size of the strontium carbonate particles in the dispersion was determined by the dynamic light-scattering method. It was confirmed that the mean particle size (diameter) of the dispersed strontium carbonate particles was 61 nm. This mean particle size is as much as approx. 4 times the particle size calculated from BET specific surface area. Therefore, it was confirmed that the strontium carbonate particles were dispersed in the dispersion as nearly primary particles.

Example 2

A strontium carbonate powder was prepared in the same manner as in Example 1, except for replacing tartaric acid with malic acid (DL-malic acid, special class, available from Wako Junyaku Co., Ltd., 7.1 g).

Figure 2:
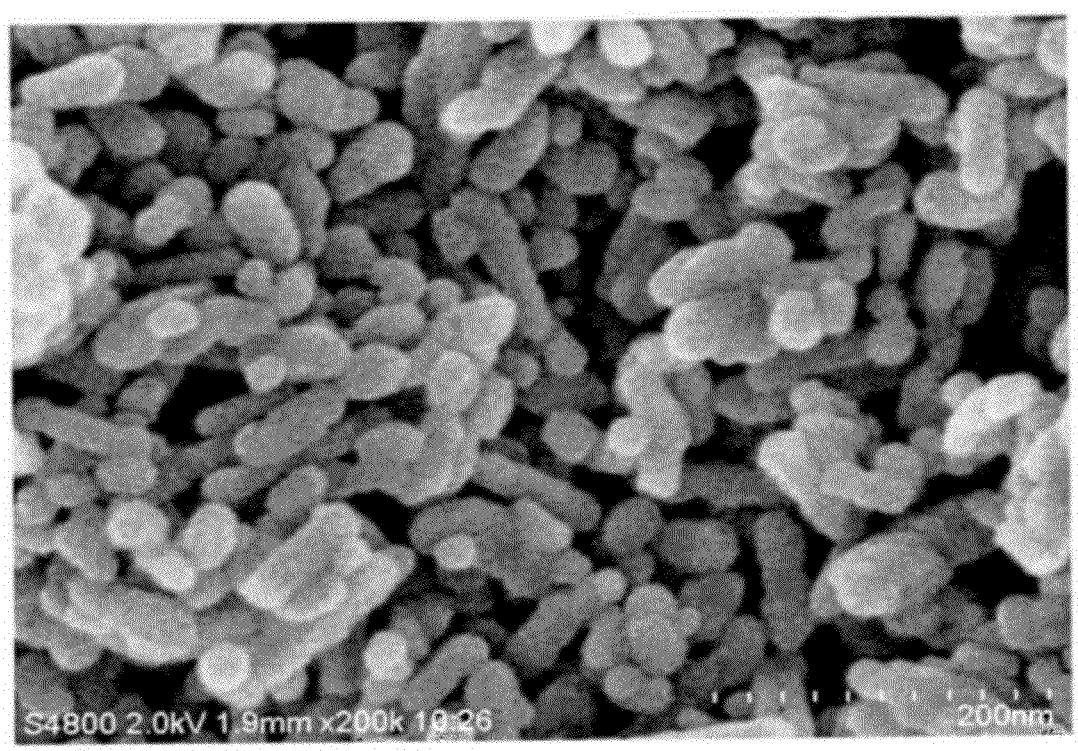
FIG. 2 is an electron microscopic image of the strontium carbonate powder produced in Example 2.

The electron microscopic image of the resulting strontium carbonate powder is shown in FIG. 2. From the image of FIG. 2, it was confirmed that the resulting strontium carbonate powder was in the form of aggregated mass of spherical particles. The strontium carbonate powder was a fine powder showing a BET specific surface area of 83.4 $m^2/g$ and a particle diameter (calculated from BET specific surface area) of 19.4 nm. A mean aspect ratio was 1.8.

Subsequently, a dispersion of strontium carbonate particles was prepared from the resulting strontium carbonate powder in the manner described in Example 1.

The average particle size of the strontium carbonate particles in the dispersion was determined by the dynamic light-scattering method. It was confirmed that the mean particle size (diameter) of the dispersed strontium carbonate particles was 116 nm. This mean particle size is as much as approx. 6 times the particle size calculated from BET specific surface area. Therefore, it was confirmed that the strontium carbonate particles were dispersed in the dispersion as nearly primary particles.

Example 3

A strontium carbonate powder was prepared in the same manner as in Example 1, except for replacing tartaris acid with gluconic acid (D-gluconic acid, special class, available from Wako Junyaku Co., Ltd., 25.5 g, namely, 15.2 weight parts per 100 weight parts of strontium hydroxide).

Figure 3:
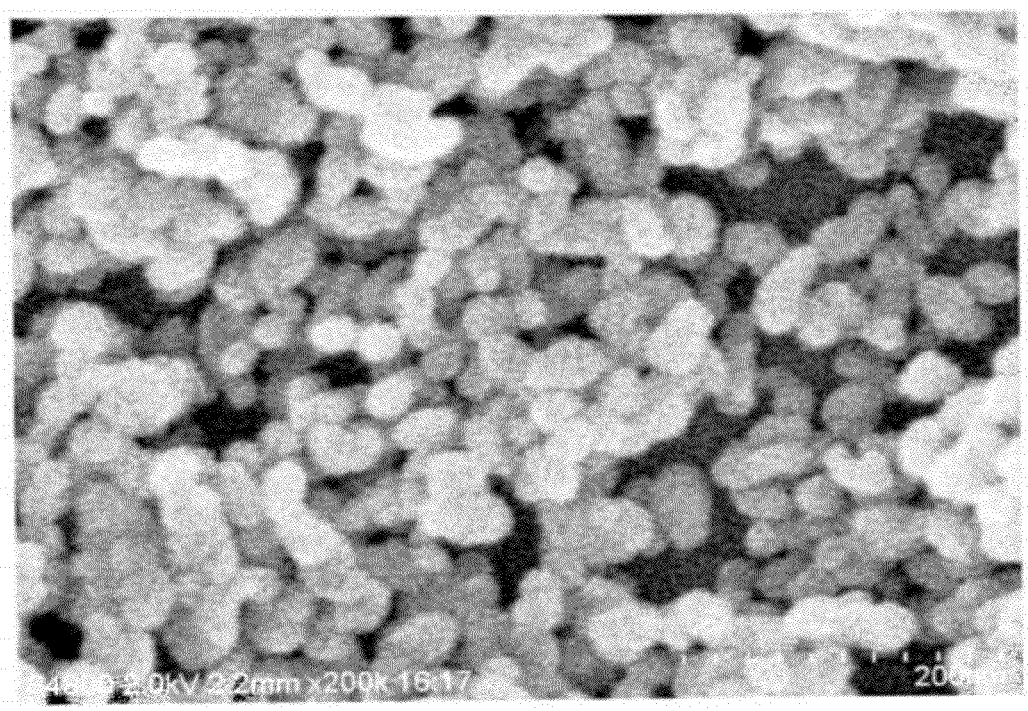
FIG. 3. is an electron microscopic image of the strontium carbonate powder produced in Example 3.

The electron microscopic image of the resulting strontium carbonate powder is shown in FIG. 3. From the image of FIG. 3, it was confirmed that the resulting strontium carbonate powder was in the form of aggregated mass of spherical particles. The strontium carbonate powder was a fine powder showing a BET specific surface area of 100 $m^2/g$ and a particle diameter (calculated from BET specific surface area) of 16.2 nm. A mean aspect ratio was 1.3.

Subsequently, a dispersion of strontium carbonate particles was prepared from the resulting strontium carbonate powder in the manner described in Example 1.

The average particle size of the strontium carbonate particles in the dispersion was determined by the dynamic light-scattering method. It was confirmed that the mean particle size (diameter) of the dispersed strontium carbonate particles was 120 nm. This mean particle size is as much as approx. 7.4 times the particle size calculated from BET specific surface area. Therefore, it was confirmed that the strontium carbonate particles were dispersed in the dispersion as nearly primary particles.

What is claimed is:

1. A fine strontium carbonate powder having a BET specific surface area of 60 to 150 $m^2/g$, which comprises spherical particles having a mean aspect ratio of 2.0 or less, said spherical particles having a polymer comprising a polycarboxylic acid or anhydride thereof having a side chain of a polyoxyalkylene group attached to surfaces thereof.

2. The fine strontium carbonate powder of claim 1, wherein the mean aspect ratio is in the range of 1.2 to 2.0.

3. A process for preparing the fine strontium carbonate powder of claim 1, which comprises the steps of:

supplying gaseous carbonate dioxide into an aqueous solution or dispersion containing strontium hydroxide in an amount of 1 to 20 wt. % under stirring at a flow rate of 0.5 to 200 mL/min., per one gram of the strontium hydroxide, in the presence of an organic acid having at least one hydroxyl group and at least one carboxyl group under the condition that a total of the hydroxyl group and carboxyl group is at least three, thereby carbonating the strontium hydroxide to give an aqueous dispersion containing strontium carbonate particles;

stirring for mixing the aqueous dispersion containing strontium carbonate particles by means of paddles rotating at a peripheral rate of 5 to 32 m/sec., in the presence of a polymer comprising a polycarboxylic acid or anhydride thereof having a side chain of a polyoxyalkylene group; and drying the stirred aqueous dispersion containing strontium carbonate particles.

4. The process of claim 3, wherein the organic acid is selected from the group consisting of tartaric acid, malic acid and gluconic acid.

5. The process of claim 3, wherein the polymer comprising a polycarboxylic acid or anhydride thereof having a side chain of a polyoxyalkylene group is added to the aqueous dispersion containing strontium carbonate particles in the step of the stirring step.

* * * * *